US009958970B2

(12) United States Patent
Feng et al.

(10) Patent No.: US 9,958,970 B2
(45) Date of Patent: May 1, 2018

(54) FLEXIBLE DISPLAY HAVING INFRARED TRANSMITTING DEVICE AND INFRARED RECEIVING DEVICE FOR RECOGNITION OF FOLDING STATE THEREOF

(71) Applicants: Boe Technology Group Co., Ltd., Beijing (CN); Ordos Yuansheng Optoelectronics Co., Ltd., Inner Mongolia (CN)

(72) Inventors: Xiang Feng, Beijing (CN); Xiangdong Wei, Beijing (CN); Yun Qiu, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

(*) Notice: Subject to any disclaimer, the term of this patent is extended or adjusted under 35 U.S.C. 154(b) by 26 days.

(21) Appl. No.: 14/767,988
(22) PCT Filed: Dec. 1, 2014
(86) PCT No.: PCT/CN2014/092653
§ 371 (c)(1),
(2) Date: Aug. 14, 2015
(87) PCT Pub. No.: WO2016/033879
PCT Pub. Date: Mar. 10, 2016

(65) Prior Publication Data
US 2016/0252988 A1 Sep. 1, 2016

(30) Foreign Application Priority Data
Sep. 3, 2014 (CN) .......................... 2014 1 0446925

(51) Int. Cl.
G06F 3/041 (2006.01)
G09G 3/20 (2006.01)
(Continued)

(52) U.S. Cl.
CPC ............ *G06F 3/041* (2013.01); *G06F 1/1652* (2013.01); *G06F 1/1694* (2013.01);
(Continued)

(58) Field of Classification Search
CPC ..................... G06F 3/041; G06F 3/042; G06F 2203/04102; G09G 3/2096; G09G 2360/14; G09G 2380/02
See application file for complete search history.

(56) References Cited

U.S. PATENT DOCUMENTS 9,632,576 B2 * 4/2017 Chon .................... G06F 3/01
2006/0221065 A1 * 10/2006 Hong ................... G06F 3/0421
345/175
(Continued)

FOREIGN PATENT DOCUMENTS

CN 101295219 10/2008
CN 202856818 U 4/2013
(Continued)

OTHER PUBLICATIONS

International Search Report and Written Opinion from PCT/CN14/92653 dated Dec. 1, 2014.

Primary Examiner — Rodney Amadiz
(74) Attorney, Agent, or Firm — Calfee, Halter & Griswold LLP

(57) ABSTRACT

The present disclosure discloses a flexible display comprising a flexible display screen, an infrared transmitting device arranged on a border of the flexible display screen and comprising at least one infrared transmitting unit, an infrared receiving device arranged on a border of the flexible display screen and comprising at least one infrared receiving unit, and a signal processing unit, signally connected to each of the infrared receiving units in the infrared receiving device, for judging a folding state of the flexible display screen based on a state of receipt of an infrared signal at each of the infrared receiving units in the infrared receiving device. By means of cooperation between the infrared transmitting device and the infrared receiving device, the flexible display may judge the folding state of the flexible (Continued)

display screen and, in turn, perform a corresponding operation, such as an interactive operation, based on this folding state. The fabricating process is simplified, thereby reducing the production cost of the flexible display.

19 Claims, 3 Drawing Sheets

(51) Int. Cl.
    *G09G 3/00*     (2006.01)
    *G06F 1/16*     (2006.01)
    *G06F 3/042*     (2006.01)

(52) U.S. Cl.
    CPC .......... *G06F 3/0416* (2013.01); *G06F 3/0428* (2013.01); *G09G 3/00* (2013.01); *G09G 3/2096* (2013.01); *G06F 2203/04102* (2013.01); *G06F 2203/04103* (2013.01); *G09G 2360/14* (2013.01); *G09G 2380/02* (2013.01)

(56) References Cited

U.S. PATENT DOCUMENTS

| | | | |
|---|---|---|---|
| 2011/0210937 A1 | 9/2011 | Kee et al. | |
| 2012/0019482 A1* | 1/2012 | Wang | G06F 1/1652 345/175 |
| 2013/0135182 A1* | 5/2013 | Jung | G09G 3/00 345/30 |
| 2013/0155052 A1* | 6/2013 | Ko | H04N 13/0022 345/419 |
| 2014/0002419 A1* | 1/2014 | Thorson | G06F 3/147 345/175 |
| 2014/0035869 A1* | 2/2014 | Yun | G06F 3/0414 345/174 |
| 2014/0098040 A1* | 4/2014 | Kwon | G06F 3/01 345/173 |
| 2014/0176429 A1* | 6/2014 | Hsieh | G06F 1/1652 345/156 |
| 2014/0210706 A1* | 7/2014 | Park | G06F 3/0487 345/156 |
| 2014/0223343 A1* | 8/2014 | Lee | G06F 3/04817 715/765 |
| 2015/0022439 A1* | 1/2015 | Alameh | G06F 3/017 345/156 |
| 2015/0091796 A1* | 4/2015 | Kwon | G06T 3/40 345/156 |
| 2016/0034047 A1* | 2/2016 | Lee | G09G 5/373 345/156 |
| 2017/0238412 A1* | 8/2017 | Huitema | H05K 1/028 361/749 |

FOREIGN PATENT DOCUMENTS

| | | |
|---|---|---|
| CN | 203520359 U | 4/2014 |
| CN | 203720811 | 7/2014 |
| TW | 201205155 | 2/2012 |

* cited by examiner

FLEXIBLE DISPLAY HAVING INFRARED TRANSMITTING DEVICE AND INFRARED RECEIVING DEVICE FOR RECOGNITION OF FOLDING STATE THEREOF

RELATED APPLICATIONS

The present application is the U.S. national phase entry of PCT/CN2014/092653, with an international filing date of Dec. 1, 2014, which claims the benefit of Chinese Patent Application No. 201410446925.9, filed on Sep. 3, 2014, the entire disclosures of which are incorporated herein by reference.

FIELD OF THE DISCLOSURE

The present disclosure relates to the field of flexible display interaction technologies, and particularly to a flexible display.

BACKGROUND OF THE DISCLOSURE

The flexible display has properties such as light weight, durability and capability of being irregularly shaped etc., which allow it to be widely used in various electronic products. Having a wide prospect in application, the flexible display is yet to be improved, especially in its interactive approach.

In the field of flexible display technologies, bending and curling behaviors of a flexible display can be defined as gestures of a user for interaction. In the current flexible display, the interaction function is generally achieved by fabricating a whole piece of fully attached sensors on the display screen of the flexible display. However, the process of fabricating the whole piece of fully attached sensors on the display screen of the flexible display is difficult, resulting in a high production cost of the flexible display.

SUMMARY

It is an object of the disclosure to provide a flexible display, in which an infrared transmitting device and an infrared receiving device are assembled with the flexible display screen in a simple manner, thereby reducing the production cost of the flexible display.

To achieve this, the disclosure provides the following technical solutions:

A flexible display comprising:
a flexible display screen;
an infrared transmitting device arranged on a border of the flexible display screen and comprising at least one infrared transmitting unit;
an infrared receiving device arranged on a border of the flexible display screen and comprising at least one infrared receiving unit; and
a signal processing unit, signally connected to each of the infrared receiving units in the infrared receiving device, for judging a folding state of the flexible display screen based on a state of receipt of an infrared signal at each of the infrared receiving units in the infrared receiving device.

In the flexible display, the infrared transmitting device arranged on the flexible display screen comprises at least one infrared transmitting unit, and the infrared receiving device comprises at least one infrared receiving unit. At least a part of the infrared transmitting units of the infrared transmitting device are arranged at a first portion of the border, and at least a part of the infrared receiving units of the infrared receiving device are arranged at a second portion of the border. When the flexible display screen is folded in a given manner, the first portion of the border of the flexible display screen will be opposite to the second portion of the border, such that the infrared receiving unit arranged at the second portion of the border is opposite to the infrared transmitting unit arranged at the first portion of the border, and thus can receive the infrared signal transmitted by the infrared transmitting unit arranged at the first portion of the border. At this point, the signal processing unit judges in which given manner the flexible display screen is folded based on the state of the receipt of the infrared signals, such as whether the infrared receiving units in the infrared receiving device have received the infrared signals and from which infrared transmitting unit/units the received infrared signal(s) is/are, and in turn, judges the folding state of the flexible display screen.

In this way, by means of cooperation between the infrared transmitting device and the infrared receiving device, the flexible display may define the bending and curling behaviors of the flexible display screen as given gestures of the user, based on which gestures interactive operations may be made with the flexible display.

Since the infrared transmitting device and the infrared receiving device in the flexible display are arranged on the border of the flexible display without need of fabricating of the whole piece of fully attached sensors in the prior art, the fabricating process is simplified, thereby reducing the production cost of the flexible display.

Optionally, the signal processing unit is further used for control of an interactive operations of the flexible display screen based on the folding state of the flexible display screen.

Optionally, the state of receipt of the infrared signal at each of the at least one infrared receiving unit comprises: whether the infrared signal has been received, and if received, from which infrared transmitting unit/units the received infrared signal is transmitted.

Optionally, the direction in which the infrared signal of the at least one infrared transmitting unit is transmitted is perpendicular to the light emergent surface of the flexible display screen.

Optionally, the at least one infrared transmitting unit and the at least one infrared receiving unit are arranged on the same surface of the flexible display screen.

Optionally, the at least one infrared transmitting unit and the at least one infrared receiving unit are arranged on different surfaces of the flexible display screen.

Optionally, a part of the at least one infrared transmitting unit is arranged on a surface of the flexible display screen, with the remaining part of the at least one infrared transmitting unit arranged on the other surface of the flexible display screen, and/or a part of the at least one infrared receiving unit is arranged on a surface of the flexible display screen, with the remaining part of the at least one infrared receiving unit arranged on the other surface of the flexible display screen.

Optionally, the light emergent surface of the flexible display screen has a rectangular shape.

Optionally, the infrared transmitting device comprises a first infrared transmitting unit and a second infrared transmitting unit, and the infrared receiving device comprises a first infrared receiving unit and a second infrared receiving unit, the first infrared transmitting unit, the second infrared transmitting unit, the first infrared receiving unit and the second infrared receiving unit being arranged on the light emergent surface of the flexible display screen and being located at a respective corner of the flexible display screen; along the column direction of the pixel units in the flexible display screen, the first infrared transmitting unit being adjacent to the second infrared transmitting unit, and the first infrared receiving unit being adjacent to the second infrared receiving unit; along the row direction of the pixel units in the flexible display screen, the first infrared transmitting unit being adjacent to the first infrared receiving unit, and the second infrared transmitting unit being adjacent to the second infrared receiving unit.

Optionally, the infrared transmitting device further comprises a third infrared transmitting unit and a fourth infrared transmitting unit, and the infrared receiving device further comprises a third infrared receiving unit and a fourth infrared receiving unit, the third infrared transmitting unit, the fourth infrared transmitting unit, the third infrared receiving unit and the fourth infrared receiving unit being arranged on the side facing away from the light emergent surface of the flexible display screen and being located at a respective corner of the flexible display screen; along the column direction of the pixel units in the flexible display screen, the third infrared transmitting unit being adjacent to the fourth infrared transmitting unit, and the third infrared receiving unit being adjacent to the fourth infrared receiving unit; along the row direction of the pixel units in the flexible display screen, the third infrared transmitting unit being adjacent to the third infrared receiving unit, and the fourth infrared transmitting unit being adjacent to the fourth infrared receiving unit.

Optionally, along the direction perpendicular to the light emergent surface of the flexible display screen: the third infrared transmitting unit is opposite to the first infrared transmitting unit; the fourth infrared transmitting unit is opposite to the second infrared transmitting unit; the third infrared receiving unit is opposite to the first infrared receiving unit; and the fourth infrared receiving unit is opposite to the second infrared receiving unit.

Optionally, the direction in which the infrared signals of the first infrared transmitting unit, the second infrared transmitting unit, the third infrared transmitting unit and the fourth infrared transmitting unit are transmitted is perpendicular to the light emergent surface of the flexible display screen.

Optionally, the light emergent surface of the flexible display screen is of a circular or trapezoidal shape.

Optionally, the flexible display screen is an organic electroluminescent display screen or a liquid crystal display screen.

Optionally, the flexible display screen is a touch screen.

Optionally, the infrared transmitting units of the infrared transmitting device are embedded in or attached on the border of the flexible display screen, and the infrared receiving units of the infrared receiving device are embedded in or attached on the border of the flexible display screen.

DETAILED DESCRIPTION

The technical solutions of embodiments of the disclosure will be described in clarity and entirety with reference to the accompanying drawings of embodiments of the disclosure. Obviously, the described embodiments are only illustrative, and not restrictive. All other embodiments derived by those skilled in the art without making any inventive effort, from the described embodiments of the disclosure, are within the protection scope of the disclosure.

Figure 1:
FIG. 1 is a structural schematic diagram of a flexible display according to an embodiment of the disclosure.

Referring to FIG. 1, the flexible display according to an embodiment of the disclosure may comprise a flexible display screen 1, an infrared transmitting device 3 arranged on the border of the flexible display screen 1 and comprising at least one infrared transmitting unit, an infrared receiving device 2 arranged on the border of the flexible display screen 1 and comprising at least one infrared receiving unit, and a signal processing unit 4, signally connected to each of the infrared receiving units in the infrared receiving device 2, for judging a folding state of the flexible display screen 1 based on a state of receipt of an infrared signal at each of the infrared receiving units in the infrared receiving device 2.

In the flexible display, the infrared transmitting device 3 arranged on the flexible display screen 1 may comprise at least one infrared transmitting unit, and the infrared receiving device 2 may comprise at least one infrared receiving unit. At least a part of the infrared transmitting units of the infrared transmitting device 3 may be arranged at a first portion of the border, and at least a part of the infrared receiving units of the infrared receiving device 2 may be arranged at a second portion of the border. Optionally, the direction in which the infrared signals of the at least one infrared transmitting unit are transmitted may be perpendicular to the light emergent surface of the flexible display screen. In this way, when the flexible display screen 1 is folded in a given manner, the first portion of the border of the flexible display screen 1 will be opposite to the second portion of the border, such that the infrared receiving unit arranged at the second portion of the border is opposite to the infrared transmitting unit arranged at the first portion of the border, and thus can receive the infrared signal transmitted by the infrared transmitting unit arranged at the first portion of the border. At this point, the signal processing unit 4 may judge in which given manner the flexible display screen 1 is folded based on the state of the receipt of the infrared signals, such as whether the infrared receiving units in the infrared receiving device 2 have received the infrared signals and from which infrared transmitting unit(s) the received infrared signal(s) is/are, and in turn, judge the folding state of the flexible display screen 1. Further, the signal processing unit 4 may also control the interactive operations of the flexible display screen 1 based on the folding state of the flexible display screen 1.

By way of example and not limitation, the infrared transmitting units of the infrared transmitting device 3 may perform pulse code modulation to the transmitted infrared light, and the signal processing unit 4 therefore can identify the origin of the infrared light, i.e., judge from which infrared transmitting unit/units the coded infrared light is transmitted, by demodulating the coded infrared light received by the infrared receiving units in the infrared receiving device 2.

In this way, by means of cooperation between the infrared transmitting device 3 and the infrared receiving device 2, the flexible display may define the bending and curling behaviors of the flexible display screen 1 as given gestures of the user, based on which interactive operations may be made with the flexible display.

Since the infrared transmitting device 3 and the infrared receiving device 2 in the flexible display are arranged on the border of the flexible display screen 1 without need of fabricating of the whole piece of fully attached sensors in the prior art, the fabricating process is simplified, thereby reducing the production cost of the flexible display.

It should be understood that the specific positions where the at least one infrared transmitting unit of the infrared transmitting device 3 and the at least one infrared receiving unit of the infrared receiving device 2 are arranged on the border of the flexible display screen 1, whether they are arranged on the light emergent surface of or the surface facing away from the light emergent surface of the flexible display screen 1, and their respective numbers etc., may be chosen with flexibility as needed, e.g. based on the shape of or the desired number of the folding states of the flexible display screen 1.

For example, the at least one infrared transmitting unit and the at least one infrared receiving unit may be arranged on either the same surface or different surfaces of the flexible display screen. Alternatively, a part of the at least one infrared transmitting unit may be arranged on a surface of the flexible display screen 1, with the remaining part of the at least one infrared transmitting unit arranged on the other surface of the flexible display screen 1, and/or a part of the at least one infrared receiving unit may be arranged on a surface of the flexible display screen 1, with the remaining part of the at least one infrared receiving unit arranged on the other surface of the flexible display screen 1.

Theoretically, each of the pairings between the infrared transmitting units and the infrared receiving units may be interpreted as a folding state, but the number of the folding states that can be implemented practically is in general limited, taking into account the practical situation, e.g. the limited foldability of the flexible display screen 1 or the convenience of the folding operation by the user. It should be understood that such a limited number of folding states are generally sufficient in applications where the folding states of the flexible display screen 1 are defined as given gestures of the user.

Furthermore, the shape of the flexible display screen 1 may have multiple options, such as a rectangle, a circle, a pentagon or an irregular shape.

Figure 2:
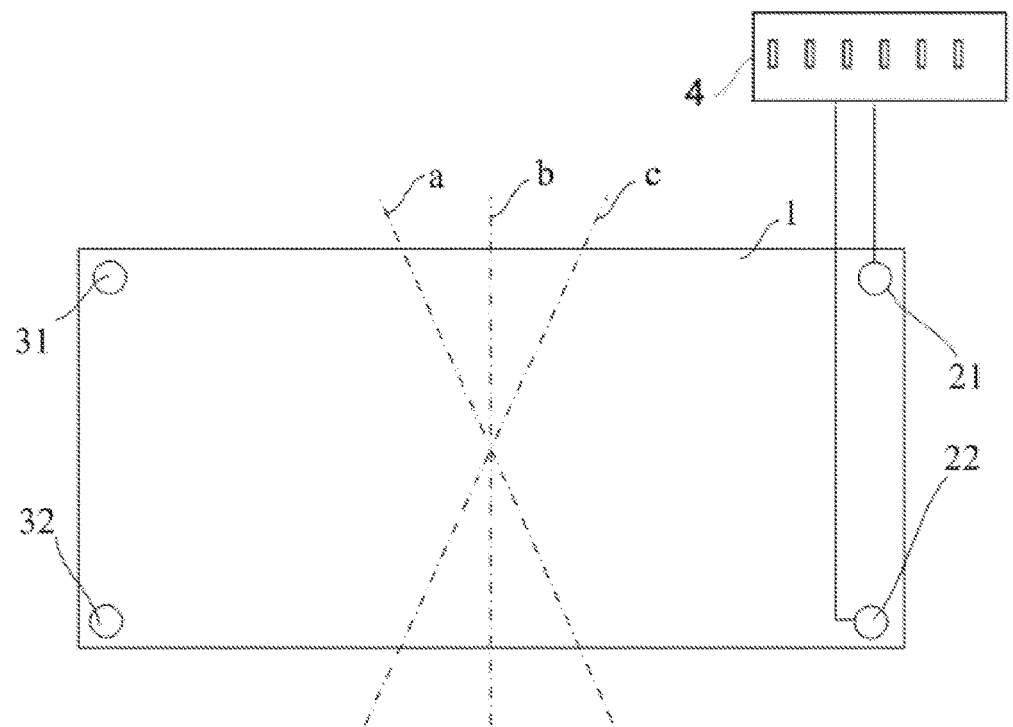
FIG. 2 is a plan view of a flexible display of a rectangular structure according to an embodiment of the disclosure.

As shown in FIG. 2, according to an embodiment of the disclosure, the light emergent surface of the flexible display screen 1 may be of a rectangular structure. Illustrations are made below taking a flexible display screen 1 of such structure for example.

As shown in the figure, the infrared transmitting device 3 may comprise a first infrared transmitting unit 31 and a second infrared transmitting unit 32, and the infrared receiving device 2 may comprise a first infrared receiving unit 21 and a second infrared receiving unit 22.

The first infrared transmitting unit 31, the second infrared transmitting unit 32, the first infrared receiving unit 21 and the second infrared receiving unit 22 are arranged on the light emergent surface of the flexible display screen 1 and are located at a respective corner of the flexible display screen 1, wherein along the column direction (the longitudinal direction in the figure) of the pixel units in the flexible display screen 1, the first infrared transmitting unit 31 is adjacent to the second infrared transmitting unit 32, and the first infrared receiving unit 21 is adjacent to the second infrared receiving unit 22; along the row direction (the lateral direction in the figure) of the pixel units in the flexible display screen 1, the first infrared transmitting unit 31 is adjacent to the first infrared receiving unit 21, and the second infrared transmitting unit 32 is adjacent to the second infrared receiving unit 22.

When the flexible display screen 1 is folded towards the light emergent surface of the flexible display screen 1 with respect to axis a, the second infrared transmitting unit 32 in the infrared transmitting device 3 will be opposite to the first infrared receiving unit 21 in the infrared receiving device 2. At this point, the first infrared receiving unit 21 can receive the infrared signal transmitted by the second infrared transmitting unit 32, whereas the remaining infrared receiving units in the infrared receiving device 2 cannot receive any infrared signal. Therefore, the signal processing unit 4 may judge that the flexible display screen 1 is in a state where it is folded with respect to axis a based on the state of receipt of the infrared signal at each of the infrared receiving units of the infrared receiving device 2.

When the flexible display screen 1 is folded towards the light emergent surface of the flexible display screen 1 with respect to axis b, the first infrared transmitting unit 31 in the infrared transmitting device 3 will be opposite to the first infrared receiving unit 21 in the infrared receiving device 2, and the second infrared transmitting unit 32 in the infrared transmitting device 3 will be opposite to the second infrared receiving unit 22 in the infrared receiving device 2. At this point, the first infrared receiving unit 21 can receive the infrared signal transmitted by the first infrared transmitting unit 31, and the second infrared receiving unit 22 can receive the infrared signal transmitted by the second infrared transmitting unit 32. Therefore, the signal processing unit 4 may judge that the flexible display screen 1 is in a state where it is folded with respect to axis b based on the state of receipt of the infrared signal at each of the infrared receiving units of the infrared receiving device 2.

When the flexible display screen 1 is folded towards the light emergent surface of the flexible display screen 1 with respect to axis c, the first infrared transmitting unit 31 in the infrared transmitting device 3 will be opposite to the second infrared receiving unit 22 in the infrared receiving device 2. At this point, the second infrared receiving unit 22 can receive the infrared signal transmitted by the first infrared transmitting unit 31, whereas the remaining infrared receiving units in the infrared receiving device 2 cannot receive any infrared signal. Therefore, the signal processing unit 4 may judge that the flexible display screen 1 is in a state where it is folded with respect to axis c based on the state of receipt of the infrared signal at each of the infrared receiving units of the infrared receiving device 2.

Further, the signal processing unit 4 may also perform an interactive operation with the flexible display screen 1 based on the gesture represented by the flexible display screen 1 in a corresponding folding state.

Of course, it may also be the case that after the folding of the flexible display screen 1 only the first infrared transmitting unit 31 in the infrared transmitting device 3 is opposite to the first receiving unit 21 in the infrared receiving device 2 after the folding of the flexible display screen 1, or instead only the second infrared transmitting unit 32 in the infrared transmitting device 3 is opposite to the second receiving unit 22 in the infrared receiving device 2. Likewise, the signal processing unit 4 may judge the folding state of the flexible display screen 1 based on the state of receipt of the infrared signal at each of the infrared receiving units in the infrared receiving device 2, and, in turn, perform a desired interactive operation with the flexible display screen 1 based on the gesture represented by the flexible display screen 1 in this folding state.

It should be further understood that the arrangement of the infrared transmitting device 3 and the infrared receiving device 2 as shown in FIG. 2 is only exemplary, and different arrangements may be utilized in further implementations. For example, along the column direction (the longitudinal direction in the FIG. 2) of the pixel units in the flexible display screen 1, the first infrared transmitting unit 31 may be adjacent to the second infrared receiving unit 22, and the first infrared receiving unit 21 may be adjacent to the second infrared transmitting unit 32; along the row direction (the lateral direction in FIG. 2) of the pixel units in the flexible display screen 1, the first infrared transmitting unit 31 may be adjacent to the first infrared receiving unit 21, and the second infrared receiving unit 22 may be adjacent to the second infrared transmitting unit 32. Similarly, in such an implementation, the folding state that the signal processing unit 4 is able to judge also varies as the positions of the infrared transmitting device 3 and the infrared receiving device 2 change. The principle of judgment is the same as that of the previous implementation, and is not discussed here in detail.

Figure 3:
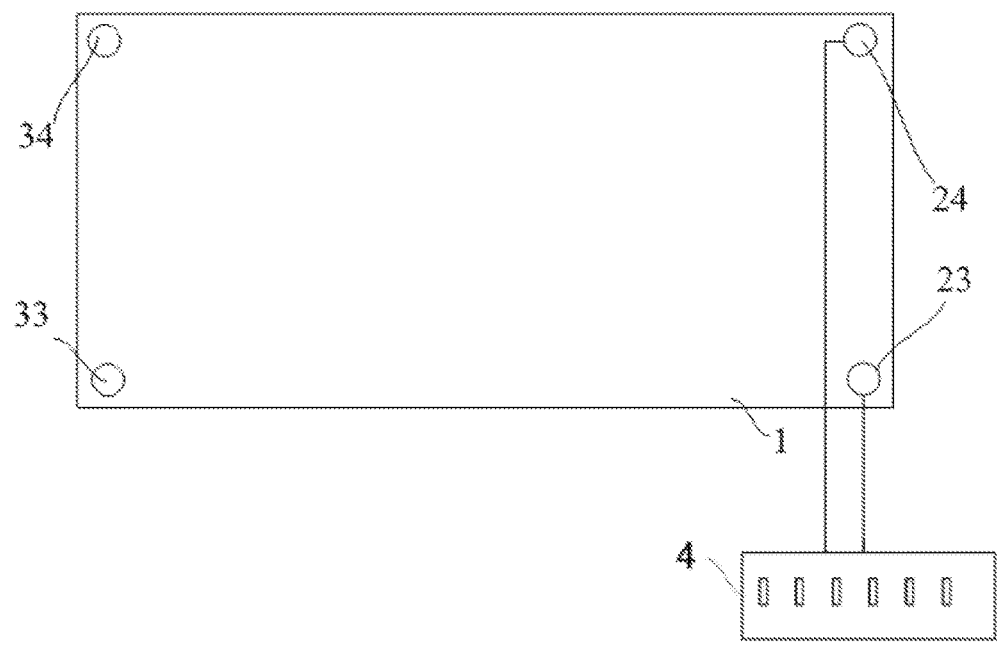
FIG. 3 is an upward view of the flexible display as shown in FIG. 2.

As shown in FIG. 3, the infrared transmitting device 3 according to an embodiment of the disclosure may also comprise a third infrared transmitting unit 33 and a fourth infrared transmitting unit 34, and the infrared receiving device 2 may further comprise a third infrared receiving unit 23 and a fourth infrared receiving unit 24.

As shown in the figure, the third infrared transmitting unit 33, the fourth infrared transmitting unit 34, the third infrared receiving unit 23 and the fourth infrared receiving unit 24 are arranged on the side facing away from the light emergent surface of the flexible display screen 1 and are located at a respective corner of the flexible display screen 1, wherein along the column direction of the pixel units in the flexible display screen 1, the third infrared transmitting unit 33 is adjacent to the fourth infrared transmitting unit 34, and the third infrared receiving unit 23 is adjacent to the fourth infrared receiving unit 24; along the row direction of the pixel units in the flexible display screen 1, the third infrared transmitting unit 33 is adjacent to the third infrared receiving unit 23, and the fourth infrared transmitting unit 34 is adjacent to the fourth infrared receiving unit 24.

When the third infrared transmitting unit 33, the fourth infrared transmitting unit 34, the third infrared receiving unit 23 and the fourth infrared receiving unit 24 are provided on the side of the flexible display screen 1 facing away from the light emergent surface, the signal processing unit 4 may judge the folding state of the flexible display screen 1 when it is folded towards the side facing away from the light emergent surface based on the state of receipt of the infrared signals at the third infrared receiving unit 23 and the fourth infrared receiving unit 24 of the infrared receiving device 2. The principle of judgment is the same as the case in which the flexible display screen 1 is folded towards the light emergent surface, and is not discussed here in detail.

Figure 4:
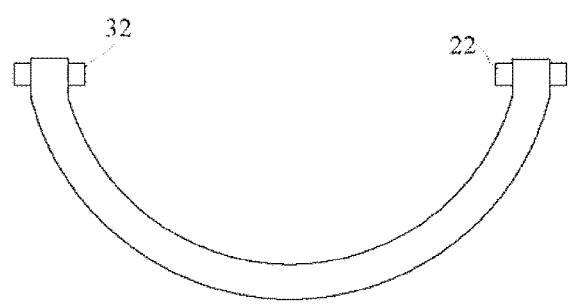
FIG. 4 is a structural schematic diagram of the flexible display as shown in FIG. 2 after being folded towards the light emergent surface of the flexible display with respect to axis b.
Figure 5:
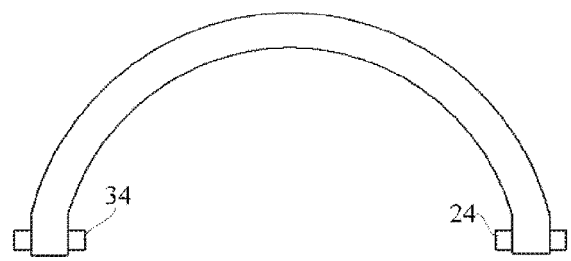
FIG. 5 is a structural schematic diagram of the flexible display as shown in FIG. 2 after being folded towards the side facing away from the light emergent surface of the flexible display with respect to axis b.

Thus, if the infrared transmitting device 3 comprises the first infrared transmitting unit 31, the second infrared transmitting unit 32, the third infrared transmitting unit 33 and the fourth infrared transmitting unit 34, and if the infrared receiving device 2 comprises the first infrared receiving unit 21, the second infrared receiving unit 22, the third infrared receiving unit 23 and the fourth infrared receiving unit 24, the signal processing unit 4 can discriminate between the folding states of the flexible display screen 1 based on the following states:

only the first infrared transmitting unit 31 is opposite to the first infrared receiving unit 21;

only the second infrared transmitting unit 32 is opposite to the second infrared receiving unit 22;

only the first infrared transmitting unit 31 is opposite to the second infrared receiving unit 22;

only the second infrared transmitting unit 32 is opposite to the first infrared receiving unit 21;

the first infrared transmitting unit 31 is opposite to the first infrared receiving unit 21, and the second infrared transmitting unit 32 is opposite to the second infrared receiving unit 22, as shown in FIG. 4;

only the third infrared transmitting unit 33 is opposite to the third infrared receiving unit 23;

only the fourth infrared transmitting unit 34 is opposite to the fourth infrared receiving unit 24;

only the third infrared transmitting unit 33 is opposite to the fourth infrared receiving unit 24;

only the fourth infrared transmitting unit 34 is opposite to the third infrared receiving unit 23;

the third infrared transmitting unit 33 is opposite to the third infrared receiving unit 23, and the fourth infrared transmitting unit 34 is opposite to the fourth infrared receiving unit 24, as shown in FIG. 5.

The signal processing unit 4 can discriminate between ten folding states of the flexible display screen 1 based on the above 10 pairings between the infrared transmitting device 3 and the infrared receiving device 2, and, in turn, control the flexible display screen to perform up to ten interactive operations.

Referring back to FIGS. 1 to 3, in the flexible display screen according to an embodiment of the disclosure, along the direction perpendicular to the light emergent surface of the flexible display screen 1:

the third infrared transmitting unit 33 is opposite to the first infrared transmitting unit 31;

the fourth infrared transmitting unit 34 is opposite to the second infrared transmitting unit 32;

the third infrared receiving unit 23 is opposite to the first infrared receiving unit 21;

the fourth infrared receiving unit 24 is opposite to the second infrared receiving unit 22.

Optionally, in the infrared transmitting device 3, the direction in which the infrared signals of the first infrared transmitting unit 31, the second infrared transmitting unit 32, the third infrared transmitting unit 33 and the fourth infrared transmitting unit 34 are transmitted is perpendicular to the light emergent surface of the flexible display screen 1. Additionally, the infrared light beam transmitted by the infrared transmitting device 3 may, for example, be cylindrical or conical.

As stated above, the number of the infrared transmitting units in the infrared transmitting device 3 and the number of the infrared receiving units in the infrared receiving device 2 may be chosen with flexibility as needed. Moreover, the number of the infrared transmitting units may not necessarily equal to that of the infrared receiving units, that is, the infrared transmitting units can be more or less than the infrared receiving units. In addition, the specific positions where the infrared transmitting units and the infrared receiving units are arranged on the flexible display screen 1 may also be deployed with flexibility.

Figure 6:
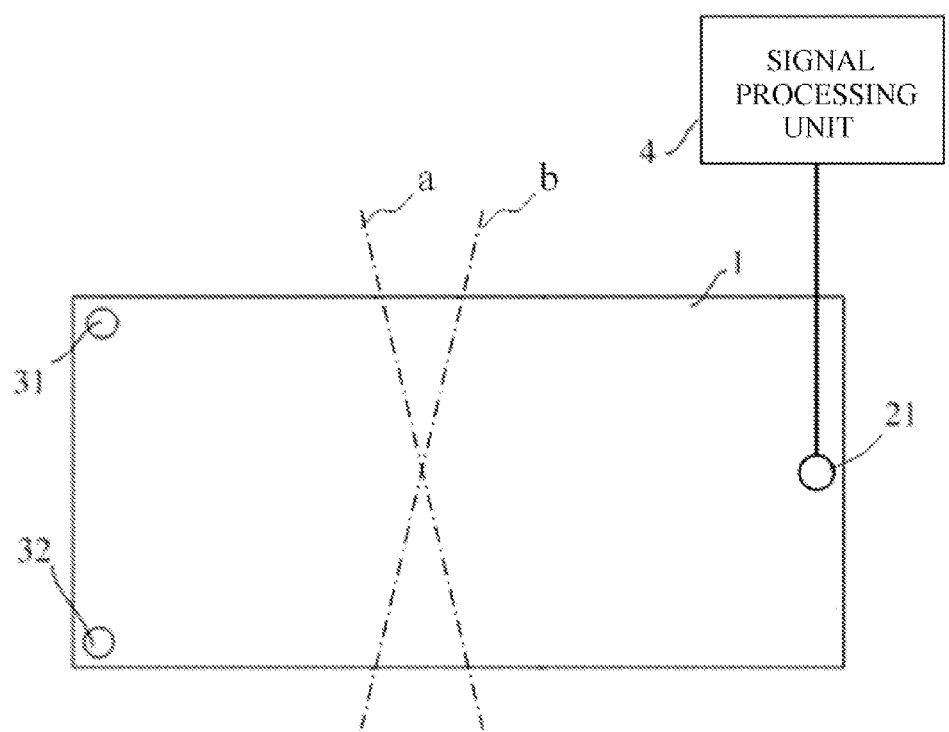
FIG. 6 is a plan view of a flexible display according to an implementation of an embodiment of the disclosure.

In an exemplary implementation as shown in FIG. 6, the infrared transmitting device 3 may comprise the first infrared transmitting unit 31 and the second infrared transmitting unit 32, and the infrared receiving device 2 may comprise the first infrared receiving unit 21. In such a configuration, the first infrared transmitting unit 31, the second infrared transmitting unit 32 and the first infrared receiving unit 21 may be arranged on the light emergent surface of the flexible display screen 1, and located respectively at different portions of the border of the flexible display screen 1, wherein the first infrared transmitting unit 31 and the second infrared transmitting unit 32 are arranged at the left-hand border of the flexible display screen 1 (with respect to the orientation as shown in the figure), and the first infrared receiving unit 21 is arranged at the right-hand border of the flexible display screen 1.

When the flexible display screen 1 is folded towards the light emergent surface of the flexible display screen 1 with respect to axis a, the second infrared transmitting unit 32 in the infrared transmitting device 3 will be opposite to the first infrared receiving unit 21 in the infrared receiving device 2. At this point, the first infrared receiving unit 21 can receive the infrared signal transmitted by the second infrared transmitting unit 32, and thus the signal processing unit 4 may judge that the flexible display screen 1 is in a state where it is folded with respect to axis a based on the state of receipt of the infrared signal at the infrared receiving unit 21 of the infrared receiving device 2.

When the flexible display screen 1 is folded towards the light emergent surface of the flexible display screen 1 with respect to axis b, the first infrared transmitting unit 31 in the infrared transmitting device 3 will be opposite to the first infrared receiving unit 21 in the infrared receiving device 2. At this point, the first infrared receiving unit 21 can receive the infrared signal transmitted by the first infrared transmitting unit 31, and thus the signal processing unit 4 may judge that the flexible display screen 1 is in a state where it is folded with respect to axis b based on the state of receipt of the infrared signal at the infrared receiving unit 21 of the infrared receiving device 2.

When the flexible display screen 1 is folded towards the light emergent surface of the flexible display screen 1 with respect to both axes a and b, both the first infrared transmitting unit 31 and the second infrared transmitting unit 32 in the infrared transmitting device 3 will be opposite to the first infrared receiving unit 21 in the infrared receiving device 2. At this point, the first infrared receiving unit 21 can receive infrared signals from both the first infrared transmitting unit 31 and the second infrared transmitting unit 32, and thus the signal processing unit 4 may judge that the flexible display screen 1 is in a state where it is folded with respect to both axes a and b based on the state of receipt of the infrared signals at the infrared receiving unit 21 of the infrared receiving device 2.

Further, the signal processing unit 4 may also perform an interactive operation with the flexible display screen 1 based on the gesture represented by the flexible display screen 1 in a corresponding folding state.

Specifically, when the flexible display screen 1 is in a given folding state, the corresponding interactive operation may be increasing volume, increasing brightness, decreasing volume, decreasing brightness, opening a program, closing a program, answering an incoming call, hanging up a call, locking the screen, unlocking the screen, splitting screen display, and the like. Of course, the user can set by himself/ herself the correspondence between the folding state of the flexible display screen 1 and the interactive operation as needed, which is not discussed here in detail.

In further embodiments, in case the flexible display screen 1 of the flexible display is of an irregular shape, such as circular, trapezoidal, etc., the flexible display may still perform various interactive operations, with the infrared transmitting units of the infrared transmitting device and the infrared receiving units of the infrared receiving device arranged at appropriate positions on the border of the flexible display screen 1.

In the above embodiments, the flexible display screen 1 in the flexible display may be an organic electroluminescent display screen or a flexible liquid crystal display screen. Moreover, the flexible display screen 1 may be a touch screen or a non-touch screen.

Additionally, in the flexible displays provided by the above embodiments, the infrared transmitting units of the infrared transmitting device 3 may be embedded in the border of the flexible display screen 1, and the infrared receiving units of the infrared receiving device 2 may also be embedded in the border of the flexible display screen 1. Alternatively, the infrared transmitting units of the infrared transmitting device 3 and the infrared receiving units of the infrared receiving device 2 may be arranged on the border of the flexible display screen 1 through, for example, adhesion (attachment).

It should be further noted that the inherent pattern of the signal pulse of the individual infrared transmitting units in the infrared transmitting device 3 may be initialized to eliminate the interference from infrared signals produced by other devices when the flexible display is performing interactive operations.

Obviously, various modifications and variations to embodiments of the disclosure may be made by those skilled in the art without departing from the spirit and scope of the disclosure. Thus, if these modifications and variations fall within the scope of the appended claims and equivalents thereof, the disclosure is intended to encompass these modifications and variations.

What is claimed is:

1. A flexible display comprising: a flexible display screen; an infrared transmitting device arranged on a border of the flexible display screen and comprising a first infrared transmitting unit and a second infrared transmitting unit that are separate from each other; an infrared receiving device arranged on the border of the flexible display screen and comprising at least one infrared receiving unit, wherein the at least one infrared receiving unit is operable to receive an infrared signal transmitted from the infrared transmitting device; and a signal processing unit signally connected to the at least one infrared receiving unit, wherein the signal processing unit is configured to identify different folding states where the flexible display screen is folded along different axes by recognizing whether the infrared signal is received by the at least one infrared receiving unit and when received, from which of the first infrared transmitting unit and the second infrared transmitting unit the received infrared signal is transmitted, the different axes comprising axes intersecting each other.

2. The flexible display according to claim 1, wherein the signal processing unit is further configured to control an interactive operation of the flexible display screen based on the identified folding state of the flexible display screen.

3. The flexible display according to claim 2, wherein the first and second infrared transmitting units are embedded in or attached on the border of the flexible display screen, and the at least one infrared receiving unit is embedded in or attached on the border of the flexible display screen.

4. The flexible display according to claim 1, wherein each of the first and second infrared transmitting units is configured to transmit an infrared signal in a direction perpendicular to the light emergent surface of the flexible display screen.

5. The flexible display according to claim 4, wherein the first and second infrared transmitting units are embedded in or attached on the border of the flexible display screen, and the at least one infrared receiving unit is embedded in or attached on the border of the flexible display screen.

6. The flexible display according to claim 1, wherein the first and second infrared transmitting units are arranged at a first portion of the border of the flexible display screen, and the at least one infrared receiving unit is arranged at a second portion of the border of the flexible display screen.

7. The flexible display according to claim 1, wherein the first and second infrared transmitting units and the at least one infrared receiving unit are arranged on the same surface of the flexible display screen.

8. The flexible display according to claim 1, wherein the first and second infrared transmitting units and the at least one infrared receiving unit are arranged on different surfaces of the flexible display screen.

9. The flexible display according to claim 1, wherein the infrared transmitting device further comprises at least one additional infrared transmitting unit, wherein the first and second infrared transmitting units are arranged on a first surface of the flexible display screen and the at least one additional infrared transmitting unit is arranged on a second surface of the flexible display screen that is opposite to the first surface, or wherein the infrared receiving device comprises a plurality of the infrared receiving units, wherein at least one of the plurality of infrared receiving units is arranged on a first surface of the flexible display screen and the remaining ones of the plurality of infrared receiving units are arranged on a second surface of the flexible display screen that is opposite to the first surface.

10. The flexible display according to claim 1, wherein the light emergent surface of the flexible display screen has a rectangular shape.

11. The flexible display according to claim 10, wherein the infrared receiving device comprises a first infrared receiving unit and a second infrared receiving unit, the first infrared transmitting unit, the second infrared transmitting unit, the first infrared receiving unit and the second infrared receiving unit being arranged on the light emergent surface of the flexible display screen and being located at a respective corner of the flexible display screen; along the column direction of the pixel units in the flexible display screen, the first infrared transmitting unit being adjacent to the second infrared transmitting unit, and the first infrared receiving unit being adjacent to the second infrared receiving unit; along the row direction of the pixel units in the flexible display screen, the first infrared transmitting unit being adjacent to the first infrared receiving unit, and the second infrared transmitting unit being adjacent to the second infrared receiving unit.

12. The flexible display according to claim 11, wherein the infrared transmitting device further comprises a third infrared transmitting unit and a fourth infrared transmitting unit, and the infrared receiving device further comprises a third infrared receiving unit and a fourth infrared receiving unit, the third infrared transmitting unit, the fourth infrared transmitting unit, the third infrared receiving unit and the fourth infrared receiving unit being arranged on the side of the flexible display screen facing away from the light emergent surface and being located at a respective corner of the flexible display screen; along the column direction of the pixel units in the flexible display screen, the third infrared transmitting unit being adjacent to the fourth infrared transmitting unit, and the third infrared receiving unit being adjacent to the fourth infrared receiving unit; along the row direction of the pixel units in the flexible display screen, the third infrared transmitting unit being adjacent to the third infrared receiving unit, and the fourth infrared transmitting unit being adjacent to the fourth infrared receiving unit.

13. The flexible display according to claim 12, wherein along the direction perpendicular to the light emergent surface of the flexible display screen, the third infrared transmitting unit is opposite to the first infrared transmitting unit; the fourth infrared transmitting unit is opposite to the second infrared transmitting unit; the third infrared receiving unit is opposite to the first infrared receiving unit; and the fourth infrared receiving unit is opposite to the second infrared receiving unit.

14. The flexible display according to claim 12, wherein each of the first infrared transmitting unit, the second infrared transmitting unit, the third infrared transmitting unit and the fourth infrared transmitting unit is configured to transmit an infrared signal in a direction perpendicular to the light emergent surface of the flexible display screen.

15. The flexible display according to claim 1, wherein the light emergent surface of the flexible display screen is of a circular or trapezoidal shape.

16. The flexible display according to claim 1, wherein the flexible display screen is an organic electroluminescent display screen or a liquid crystal display screen.

17. The flexible display according to claim 1, wherein the flexible display screen is a touch screen.

18. The flexible display according to claim 1, wherein the first and second infrared transmitting units are embedded in or attached on the border of the flexible display screen, and the at least one infrared receiving unit is embedded in or attached on the border of the flexible display screen.

19. The flexible display according to claim 1, wherein the first and second infrared transmitting units are embedded in or attached on the border of the flexible display screen, and the at least one infrared receiving unit is embedded in or attached on the border of the flexible display screen.

* * * * *